(12) United States Patent
Takata

(10) Patent No.: US 12,134,566 B2
(45) Date of Patent: Nov. 5, 2024

(54) METHOD FOR PRODUCING INDIUM TIN OXIDE PARTICLES AND METHOD FOR PRODUCING CURABLE COMPOSITION

(71) Applicant: FUJIFILM Corporation, Tokyo (JP)

(72) Inventor: Masahiro Takata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 638 days.

(21) Appl. No.: 17/481,849

(22) Filed: Sep. 22, 2021

(65) Prior Publication Data

US 2022/0009788 A1    Jan. 13, 2022

Related U.S. Application Data

(63) Continuation of application No. PCT/JP2020/003909, filed on Feb. 3, 2020.

(30) Foreign Application Priority Data

Mar. 28, 2019 (JP) ................. 2019-064592

(51) Int. Cl.
  *C01G 19/02*    (2006.01)
  *C08F 2/44*     (2006.01)

(52) U.S. Cl.
  CPC .............. *C01G 19/02* (2013.01); *C08F 2/44* (2013.01)

(58) Field of Classification Search
  CPC .................... C01G 19/02; C08F 2/44
  USPC ....................................... 423/618
  See application file for complete search history.

(56) References Cited

U.S. PATENT DOCUMENTS

| 9,517,945 B2 | 12/2016 | Ito et al. |
| 2015/0259217 A1 | 9/2015 | Ito et al. |
| 2020/0165438 A1 | 5/2020 | Ono et al. |

FOREIGN PATENT DOCUMENTS

| JP | 2014-145050 A | 8/2014 |
| JP | 2014-146547 A | 8/2014 |
| JP | 2015-003866 A | 1/2015 |
| WO | 2019/049609 A1 | 3/2019 |

OTHER PUBLICATIONS

WO-2019049609-A1 English translation (Year: 2019).*

(Continued)

*Primary Examiner* — Anita Nassiri-Motlagh
(74) *Attorney, Agent, or Firm* — Sughrue Mion, PLLC

(57) ABSTRACT

In one embodiment of the present invention, provided are a method for producing indium tin oxide particles, including a step of obtaining a precursor solution including indium and tin by heating an indium carboxylate having 1 to 3 carbon atoms and a tin carboxylate having 1 to 3 carbon atoms in a solvent including a carboxylic acid having 6 to 20 carbon atoms, and a step of obtaining a reaction solution including indium tin oxide particles by adding dropwise the obtained precursor solution to a heated solvent including oleyl alcohol and linear alcohol having 14 to 18 carbon atoms, in which, in the solvent, a concentration A of the linear alcohol having 14 to 18 carbon atoms with respect to all solvents, in units of % by mass, and a concentration B of the oleyl alcohol with respect to all solvents, in units of % by mass, satisfy the expression 1; and a method for producing a curable composition.

$A/(A+B) > 0.062$:    Expression 1

11 Claims, 1 Drawing Sheet

(56) References Cited

OTHER PUBLICATIONS

International Search Report dated Apr. 14, 2020 in Application No. PCT/JP2020/003909.
Written Opinion of the International Searching Authority dated Apr. 14, 2020 in Application No. PCT/JP2020/003909.
International Preliminary Report on Patentability dated Sep. 28, 2021 with a Translation of the Written Opinion of the International Searching Authority in Application No. PCT/JP2020/003909.
Adam W. Jansons et al., "Continuous Growth of Metal Oxide Nanocrystals: Enhanced Control of Nanocyrstal Size and Radial Dopant Distribution", American Chemical Society, 2016, vol. 10, pp. 6942-6951 (10 pages total).
Notice of Reasons for Refusal dated Jun. 7, 2022 from the Japanese Patent Office in Japanese Application No. 2021-508170.

\* cited by examiner

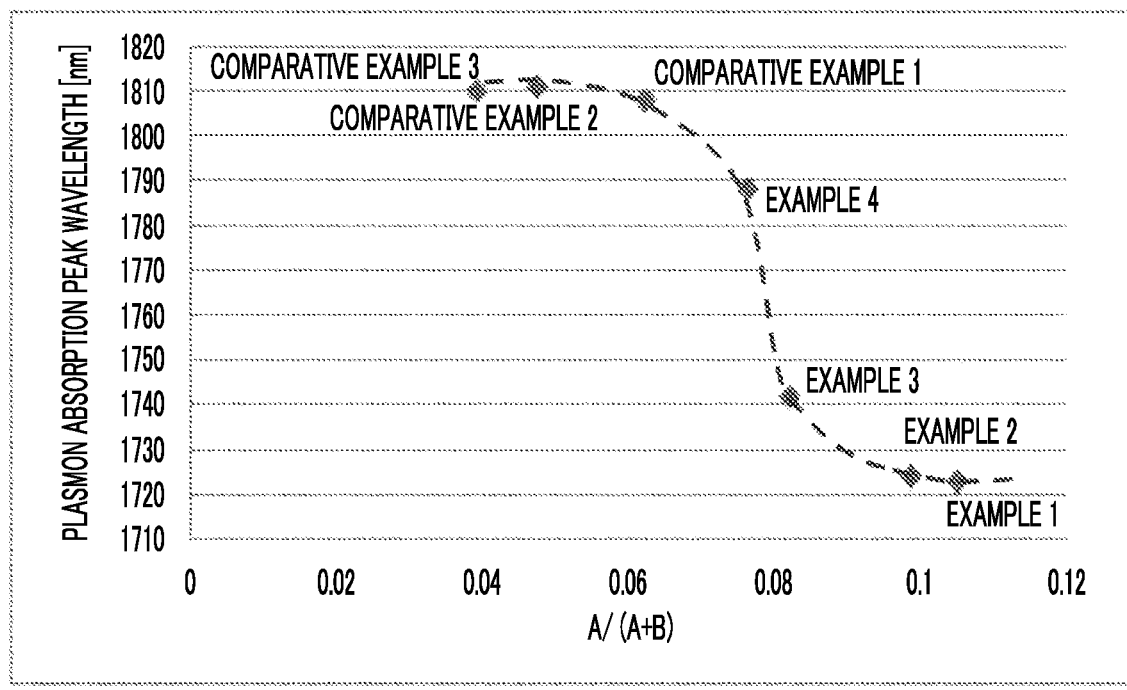

METHOD FOR PRODUCING INDIUM TIN OXIDE PARTICLES AND METHOD FOR PRODUCING CURABLE COMPOSITION

CROSS-REFERENCE TO RELATED APPLICATIONS

This application is a continuation application of International Application No. PCT/JP2020/003909, filed Feb. 3, 2020, the disclosure of which is incorporated herein by reference in its entirety. Further, this application claims priority from Japanese Patent Application No. 2019-064592, filed Mar. 28, 2019, the disclosure of which is incorporated herein by reference in its entirety.

BACKGROUND OF THE INVENTION

1. Field of the Invention

The present disclosure relates to a method for producing indium tin oxide particles and a method for producing a curable composition.

2. Description of the Related Art

Indium tin oxide (hereinafter, also referred to as "ITO") particles have come to be used for various uses. Among these, ITO particles having a high absorbance in a near infrared region are useful for forming an optical material such as a diffraction grating lens and an infrared filter, and can achieve a composite material having a low Abbe number.

Therefore, various methods for producing ITO particles having absorption in a near infrared region at a wavelength of 1800 nm or less have been studied.

For example, US2015/0259217A and "Continuous Growth of Metal Oxide Nanocrystals: Enhanced Control of Nanocrystal Size and Radial Dopant Distribution", American Chemical Society, Vol. 10, pp. 6942-6951 (2016) disclose a method for producing metal oxide nanoparticles by preparing a solution including a carboxylic acid metal salt and a carboxylic acid and dropwise adding the obtained solution to an alcohol at a temperature of 250° C. or lower to react.

In addition, for example, U.S. Pat. No. 9,517,945B discloses a method for producing nanoparticles, in which a solution including a metal carboxylate is added dropwise to oleyl alcohol heated to 100° C. to 290° C.

SUMMARY OF THE INVENTION

However, as in the invention disclosed in U.S. Pat. No. 9,517,945B, in a case where oleyl alcohol is used alone as a solvent of adding dropwise the solution including a metal carboxylate to the solvent, carrier generation efficiency tends to decrease, and the plasmon absorption tends to be a long wavelength. The phenomenon in which the plasmon absorption is a long wavelength is an important problem to be solved in filter applications or optical member applications such as lens, in which it is required to selectively have optical absorption in the near infrared region.

In light of these problems, there is a high demand for a material capable of obtaining high absorbance in the near infrared region at a wavelength of 1800 nm or less.

The present disclosure has been made in view of the above.

An object to be achieved by one embodiment of the present disclosure is to provide a method for producing indium tin oxide particles, in which indium tin oxide particles having good absorption in a near infrared region at a wavelength of 1800 nm or less is produced.

An object to be achieved by another embodiment of the present disclosure is to provide a method for producing a curable composition which includes indium tin oxide particles having absorption in a near infrared region, has a low Abbe number, and is useful for optical material applications.

The specific methods for achieving the objects include the following aspects.

<1> A method for producing indium tin oxide particles, comprising:
 a step of obtaining a precursor solution including indium and tin by heating an indium carboxylate having 1 to 3 carbon atoms and a tin carboxylate having 1 to 3 carbon atoms in a solvent including a carboxylic acid having 6 to 20 carbon atoms; and
 a step of obtaining a reaction solution including indium tin oxide particles by adding dropwise the obtained precursor solution to a heated solvent including oleyl alcohol and linear alcohol having 14 to 18 carbon atoms,
 in which, in the solvent, a concentration A of the linear alcohol having 14 to 18 carbon atoms with respect to all solvents, in units of % by mass, and a concentration B of the oleyl alcohol with respect to all solvents, in units of % by mass, satisfy the following expression 1, $$A/(A+B) > 0.062:  \quad \text{Expression 1.}$$

<2> The method for producing indium tin oxide particles according to <1>,
 in which the concentration A and the concentration B satisfy the following expression 2, $$A/(A+B) > 0.082:  \quad \text{Expression 2.}$$

<3> The method for producing indium tin oxide particles according to <1> or <2>,
 in which the concentration A and the concentration B satisfy a condition of the following expression 3, $$(A+B) > 90\% \text{ by mass}:  \quad \text{Expression 3.}$$

<4> The method for producing indium tin oxide particles according to any one of <1> to <3>,
 in which the linear alcohol having 14 to 18 carbon atoms includes 1-hexadecanol.

<5> The method for producing indium tin oxide particles according to any one of <1> to <4>,
 in which a temperature of the heated solvent is 230° C. to 320° C.

<6> The method for producing indium tin oxide particles according to any one of <1> to <5>,
 in which, in the step of obtaining the reaction solution including the indium tin oxide particles, the precursor solution is added dropwise at a dropping rate of 1.0 mL/min or more.

<7> The method for producing indium tin oxide particles according to any one of <1> to <6>,
 in which a total molar concentration of metals included in the precursor solution is 0.1 mmol/mL or more.

<8> The method for producing indium tin oxide particles according to any one of <1> to <7>,
 in which a total content C mol of hydroxy groups included in the oleyl alcohol and the linear alcohol having 14 to 18 carbon atoms and a content D mol of the carboxylic acid having 6 to 20 carbon atoms included in the precursor solution satisfy the following expression 4, $$D/(C+D)<0.5: \qquad \text{Expression 4.}$$

<9> The method for producing indium tin oxide particles according to any one of <1> to <8>,
  in which the carboxylic acid having 6 to 20 carbon atoms includes oleic acid.
<10> The method for producing indium tin oxide particles according to any one of <1> to <9>,
  in which the indium carboxylate having 1 to 3 carbon atoms is indium acetate, and
  the tin carboxylate is tin (IV) acetate.
<11> A method for producing a curable composition, comprising:
  a step of obtaining indium tin oxide particles by the method for producing indium tin oxide particles according to any one of <1> to <10>; and
  a step of obtaining a curable composition having absorption in a near infrared region by mixing the obtained indium tin oxide particles and a polymerizable compound.

According to one embodiment of the present disclosure, a method for producing indium tin oxide particles, in which indium tin oxide particles having good absorption in a near infrared region at a wavelength of 1800 nm or less is produced, is provided.

According to another embodiment of the present disclosure, a method for producing a curable composition which includes indium tin oxide particles having absorption in a near infrared region, has a low Abbe number, and is useful for optical material applications is provided.

BRIEF DESCRIPTION OF THE DRAWINGS

FIG. 1 is a graph showing the relationship between A/(A+B) determined by the concentration A of linear alcohol having 14 to 18 carbon atoms and the concentration B of oleyl alcohol, and the plasmon absorption peak wavelength of ITO particles.

DESCRIPTION OF THE PREFERRED EMBODIMENTS

Hereinafter, the method for producing indium tin oxide particles and the method for producing a curable composition according to the embodiment of the present disclosure will be described in detail. The description of configuration requirements below is made based on representative embodiments of the present disclosure, but the present disclosure is not limited to the following embodiments.

In the present specification, a numerical range described by using "to" represents a numerical range including numerical values before and after "to" as a lower limit value and an upper limit value.

In a numerical range described in a stepwise manner in the present specification, an upper limit value or a lower limit value described in a certain numerical range may be replaced with an upper limit value or a lower limit value in another numerical range described in a stepwise manner. In addition, in a numerical range described in the present specification, an upper limit value or a lower limit value described in a certain numerical range may be replaced with a value described in Examples.

In the present specification, in a case where a plurality of substances corresponding to each component in a composition is present, the amount of each component in the composition means the total amount of the plurality of substances present in the composition, unless otherwise specified.

In addition, a combination of two or more preferred aspects is a more preferred aspect.

In the present specification, the term "step" includes not only the independent step but also a step in which intended purposes are achieved even in a case where the step cannot be precisely distinguished from other steps.

A description for a group (atomic group) in the present disclosure is used in a meaning including an unsubstituted group and a group having a substituent, unless otherwise specified. For example, "alkyl group" is used in a meaning including both of an alkyl group (unsubstituted alkyl group) having no substituent and an alkyl group (substituted alkyl group) having a substituent. The same applies to other substituents.

In addition, in the present specification, "(meth)acrylic" represents both or either of acrylic and methacrylic, and "(meth)acrylate" represents both or either of acrylate and methacrylate.

<Method for Producing Indium Tin Oxide Particles>

The method for producing indium tin oxide (ITO) particles according to the embodiment of the present disclosure includes a step (hereinafter, also referred to as a step (I)) of obtaining a precursor solution including indium and tin by heating an indium carboxylate having 1 to 3 carbon atoms and a tin carboxylate having 1 to 3 carbon atoms in a solvent including a carboxylic acid having 6 to 20 carbon atoms, and a step (hereinafter, also referred to as a step (II)) of obtaining a reaction solution including indium tin oxide particles by adding dropwise the obtained precursor solution to a heated solvent including oleyl alcohol and linear alcohol having 14 to 18 carbon atoms, in which, in the solvent, a concentration A (unit: % by mass) of the linear alcohol having 14 to 18 carbon atoms with respect to all solvents and a concentration B (unit: % by mass) of the oleyl alcohol with respect to all solvents satisfy the following expression 1.

$$A/(A+B)>0.062: \qquad \text{Expression 1.}$$

The present disclosure may further include a step of, after the completion of the dropwise addition of the precursor solution, retaining the obtained reaction solution at a predetermined temperature condition, and for example, may further include a step (step (III)) of retaining the obtained reaction solution under a temperature condition of 230° C. to 320° C. for 60 minutes to 180 minutes.

In the related art, shortening of plasmon absorption has been studied in order to selectively obtain optical absorption in the near infrared region. However, for example, as in U.S. Pat. No. 9,517,945B, in a case where oleyl alcohol is used alone as a solvent in a case where a solution including a metal carboxylate is added dropwise to the solvent to form particles, carrier generation efficiency tends to decrease, and as a result, the plasmon absorption tends to be a long wavelength.

That is, indium oleate and tin oleate included in the precursor solution, and oleyl alcohol and long-chain linear alcohol (for example, 1-hexadecanol), which are the solvent, are oxidized through an esterification reaction and a dehydration to form oxide particles. In this case, since the reaction rates of indium oleate and tin oleate are different, the indium/tin ratio of the particles formed is not the same as the indium/tin ratio of the precursor solution. In addition, composition around the center of the particles formed by the relatively fast-reacting particles tends to be mainly indium, and conversely, composition near the surface of the particles formed by the relatively slow-reacting particles tends to be mainly tin. Therefore, the activation rate decreases and the carrier concentration decreases, and as a result, the plasmon absorption wavelength shifts to the long wavelength side.

In the present disclosure, the reaction rate is improved by a selective combination of solvents.

That is, by appropriately controlling the ratio of the oleyl alcohol to the long-chain linear alcohol, the reaction rate can be improved, the composition distribution as described above is suppressed, and the activation rate is improved. As a result, it is presumed that the plasmon absorption wavelength tends to be shortened.

As described above, the method for producing ITO particles according to the embodiment of the present disclosure includes a step of obtaining a reaction solution including indium tin oxide particles by adding dropwise the precursor solution including indium and tin to a solvent including oleyl alcohol and linear alcohol having 14 to 18 carbon atoms.

As a result, indium tin oxide particles exhibiting high absorbance in the near infrared region at a wavelength of 1800 nm or less can be obtained.

[Step (I)]

The step (I) is a step of obtaining a precursor solution including indium and tin by heating an indium carboxylate having 1 to 3 carbon atoms and a tin carboxylate having 1 to 3 carbon atoms in a solvent including a carboxylic acid having 6 to 20 carbon atoms.

(Indium Raw Material and Tin Raw Material)

As an indium raw material and a tin raw material used for preparing the precursor solution, an indium carboxylate having 1 to 3 carbon atoms and a tin carboxylate having 1 to 3 carbon atoms are used.

Specific examples of the indium raw material include indium formate, indium acetate, and indium propionate, and at least one indium carboxylate selected from the group consisting of these indium raw materials is used. Among these, from the viewpoint of stability, handleability, supply stability, and cost, indium acetate is preferable.

Examples of the tin raw material include tin (II) formate, tin (IV) formate, tin (II) acetate, tin (IV) acetate, tin (II) propionate, and tin (IV) propionate, and at least one tin carboxylate selected from the group consisting of these tin raw materials is used. Among these, from the viewpoint of stability, handleability, supply stability, and cost, tin (II) acetate or tin (IV) acetate is preferable, and tin (IV) acetate is more preferable.

By using the above-described indium raw material and tin raw material, the indium raw material and the tin raw material are easily dissolved in the solvent in a case of being heated in the solvent including a carboxylic acid having 6 to 20 carbon atoms. Therefore, it is possible to easily obtain a precursor solution in which the carboxylic acid having 6 to 20 carbon atoms is coordinated to indium and tin.

Among these, from the viewpoint of raw material cost, purity, stability, handleability, easiness of forming the precursor solution, and the like, it is preferable to use indium acetate and tin (IV) acetate as a preferred combination of the above-described indium raw material and the tin raw material.

(Solvent Used for Preparing Precursor Solution)

As the solvent for preparing the precursor solution, a solvent of an organic acid which includes a carboxylic acid having 6 to 20 carbon atoms is used.

The number of carbon atoms in the carboxylic acid is 6 to 20, preferably 14 to 20.

A hydrocarbon group in the carboxylic acid may be linear, may have a branch, or may have a ring structure as long as the hydrocarbon group has the above-described range of carbon atoms.

Among these, an unsaturated fatty acid is preferable as the carboxylic acid.

Specific examples of the solvent including a carboxylic acid having 6 to 20 carbon atoms include caproic acid, caprylic acid, pelargonic acid, 2-ethylhexanoic acid, capric acid, undecanoic acid, lauric acid, myristic acid, palmitic acid, stearic acid, palmitoleic acid, oleic acid, linoleic acid, and linolenic acid. Among these, it is preferable to use, as the solvent, one or more organic acids selected from the group consisting of the above-described organic acids, it is more preferable to use one or more organic acids selected from the group consisting of caproic acid, caprylic acid, oleic acid, linoleic acid, and linolenic acid, and it is still more preferable that the solvent includes oleic acid.

Any of the above-mentioned solvents can easily dissolve, by heating, the indium carboxylate having 1 to 3 carbon atoms and tin carboxylate having 1 to 3 carbon atoms, which are the above-described indium raw material and tin raw material, and by the dissolving, it is possible to easily obtain a precursor solution in which the carboxylic acid having 6 to 20 carbon atoms is coordinated to indium and tin respectively.

(Preparation of Precursor Solution)

The precursor solution is prepared by mixing the indium carboxylate having 1 to 3 carbon atoms and the tin carboxylate having 1 to 3 carbon atoms, and the solvent which includes a carboxylic acid having 6 to 20 carbon atoms, and heating the mixture.

The indium carboxylate and the tin carboxylate are dissolved by heating, and a solution of a precursor in which the carboxylic acid having 6 to 20 carbon atoms is coordinated (for example, in a case of using oleic acid, indium oleate and tin oleate) can be obtained.

In the step (I), it is preferable that the amount of the indium carboxylate and the tin carboxylate is used such that the amount of tin with respect to the total amount of indium and tin ([Sn/(In+Sn)]) is 0.05 to 0.15 in a molar ratio.

That is, it is preferable that the amount of the indium raw material and the tin raw material is weighed and mixed such that the amount of tin with respect to the total amount of indium and tin ([Sn/(In+Sn)]) is 0.05 to 0.15 in a molar ratio.

By including indium and tin in the above-described molar ratio range, it is easy to obtain ITO particles which can be suitably used for use of optical material such as an optical filter and an optical lens and has a plasmon resonance peak of approximately 1900 nm or less.

The total molar concentration of metals included in the precursor solution is preferably 0.1 mmol (millimol)/mL or more and more preferably 0.3 mmol/mL or more.

By setting the molar concentration of metals within the above-described range, the yield of ITO particles can be easily increased.

The upper limit of the total molar concentration of metals included in the precursor solution is not particularly limited, but from the viewpoint of better solubility, the total molar concentration of metals included in the precursor solution can be set to 5 mmol/mL or less.

It is preferable that a total content C mol of hydroxy groups included in the oleyl alcohol and the linear alcohol having 14 to 18 carbon atoms and a content D mol of the carboxylic acid having 6 to 20 carbon atoms included in the precursor solution satisfy the following expression 4, and it is more preferable to satisfy the condition of the following expression 5.

$$D/(C+D)<0.5: \quad \text{Expression 4.}$$

$$D/(C+D)<0.46: \quad \text{Expression 5}$$

By satisfying the condition of the expression 4, the esterification reaction is likely to proceed and the yield of ITO particles is improved.

In a case of the reaction, from the viewpoint that the yield of ITO particles is further improved, it is preferable to satisfy the following expression 6.

$$0.1<D/(C+D)<0.5: \quad \text{Expression 6}$$

The value of D/(C+D) can be obtained by calculating the number of moles from the amounts of the carboxylic acid and alcohol solvent used in the preparation of the precursor solution in the step (I) and the respective molecular weights.

The heating temperature and heating time in a case of preparing the precursor solution are appropriately selected depending on the kinds of the indium carboxylate, the tin carboxylate, and the solvent which includes a carboxylic acid having 6 to 20 carbon atoms to be used. For example, in a case where indium acetate and tin (IV) acetate are used as the raw materials, and oleic acid is used as the solvent, it is preferable to heat at a temperature having an upper limit of 140° C. to 160° C. for approximately 1 hour. Under the above-described conditions, a yellow transparent precursor solution can be obtained.

In a case of preparing the precursor solution, in order to prevent a reaction system from being mixed with impurities such as oxygen and water, the mixing of the raw materials is preferably performed in a glove box or the like in which the oxygen concentration and the moisture concentration are controlled. In addition, in a case of preparing the precursor solution by heating the raw materials and the solvent, it is preferable to flow an inert gas such as nitrogen.

The obtained precursor solution can be applied to the next step by being filled into a syringe. In a case of filling the precursor solution into the syringe, in order to avoid mixing of oxygen and water, the filling operation is preferably performed in a glove box or the like in which the oxygen concentration and the moisture concentration are controlled.

Examples of the controlled conditions of oxygen concentration and moisture concentration include conditions in which the oxygen concentration is 5 ppm or less and the moisture concentration is 1 ppm or less, but the controlled conditions are not limited thereto.

[Step (II)]

The step (II) is a step of obtaining a reaction solution including indium tin oxide particles by adding dropwise the precursor solution obtained in the step (I) to a heated solvent including oleyl alcohol and linear alcohol having 14 to 18 carbon atoms.

(Solvent)

In the preparation of the reaction solution, a heated solvent including oleyl alcohol and linear alcohol having 14 to 18 carbon atoms is used. The solvent is selected from the viewpoint of stability at the reaction temperature.

The oleyl alcohol, which is one of the solvent, is selected from the viewpoint of stability at the reaction temperature, and since the oleyl alcohol has a boiling point sufficiently lower than the reaction temperature and has a melting point which does not become a solid in a case of being cooled to room temperature after the reaction, the oleyl alcohol has the advantage of good workability.

A solvent used in combination with the oleyl alcohol is selected from alcohols (linear alcohol having 14 to 18 carbon atoms) having a chain length shorter than the chain length of the oleyl alcohol and having a linear structure. By selectively using an alcohol having a short chain shorter than the chain length of the oleyl alcohol and having a linear structure, it is possible to improve the reaction rate, and the composition distribution due to the non-uniformity of components generated inside and on the surface of the particles can be suppressed. As a result, the absorption can be shortened in the near infrared region.

The oleyl alcohol is a compound having a hydroxy group.

Examples of the linear alcohol having 14 to 18 carbon atoms include tetradecanol, 1-hexadecanol, and 1-octadecanol. The linear alcohol having 14 to 18 carbon atoms may be a non-substituted product or a substituted product substituted with a substituent. Among the linear alcohols having 14 to 18 carbon atoms, a linear alcohol having 14 to 17 carbon atoms is preferable, and 1-hexadecanol is more preferable.

In the present disclosure, in the solvent, the oleyl alcohol and the linear alcohol having 14 to 18 carbon atoms are used in an amount such that the concentration A (% by mass) of the linear alcohol having 14 to 18 carbon atoms with respect to all solvents and the concentration B (% by mass) of the oleyl alcohol with respect to all solvents satisfy the following expression 1.

$$A/(A+B)>0.062: \quad \text{Expression 1.}$$

In a case where the ratio (A/(A+B)) of the concentrations of the oleyl alcohol and the linear alcohol having 14 to 18 carbon atoms is in a range of more than 0.062, the plasmon absorption wavelength shifts to the short wavelength side.

For the same reason as described above, the concentration ratio represented by A/(A+B) preferably satisfies the following expression.

$$A/(A+B)>0.082: \quad \text{Expression 2.}$$

Further, the upper limit of the concentration ratio represented by A/(A+B) is not particularly limited, but in a case of an alcohol which is solid at normal temperature, such as 1-hexadecanol, since the alcohol may not be soluble in a case where the amount of the alcohol with respect to the oleyl alcohol is extremely large, the upper limit may be in a range in which the alcohol can be dissolved in the oleyl alcohol, and is preferably 0.3 and more preferably 0.2.

Further, among these, A/(A+B) is still more preferably satisfied with the following expression 2-a, and particularly preferably satisfied with the following expression 2-b.

$$0.3>A/(A+B)>0.082: \quad \text{Expression 2-a}$$

$$0.2>A/(A+B)>0.082: \quad \text{Expression 2-b}$$

It is preferable that the concentration A of the linear alcohol having 14 to 18 carbon atoms with respect to all solvents and the concentration B of the oleyl alcohol with respect to all solvents satisfy the condition of the following expression 3.

$$(A+B)>90\% \text{ by mass}: \quad \text{Expression 3.}$$

Further, it is preferable to satisfy the condition of the following expression 3-a.

$$(A+B)>95\% \text{ by mass}: \quad \text{Expression 3-a}$$

Here, the concentrations of the oleyl alcohol and the linear alcohol having 14 to 18 carbon atoms can be measured by the following method.

<Analysis Conditions>
GC/FID device: gas chromatograph device GC-2014 manufactured by Shimadzu Corporation
Column: DB17 (length: 30 m, inner diameter: 0.25 mm, film thickness: 0.25 μm)
Injection amount: 1 μL
Flow rate: 1 mL/min
Split ratio: 1:100
Column temperature: 80° C. (2 min)→10° C./min→300° C. (10 min)
<Concentration Calculation Method>
With regard to a GC/FID chromatogram obtained by measuring a methanol-diluted product of a mixed solvent in which the oleyl alcohol and the linear alcohol having 14 to 18 carbon atoms (for example, 1-hexadecanol) are mixed, the sum of peak surface area ratios of each component is set to 100%, and the concentrations of the oleyl alcohol and 1-hexadecanol are calculated.

In the present step, the linear alcohol having 14 to 18 carbon atoms and the oleyl alcohol are heated, and the precursor solution in which the carboxylic acid is coordinated with indium and tin, which is obtained in the step (I), is added dropwise to the heated solvent.

As a result, ITO particles are formed in the reaction solution.

Regarding the action and effect in this case, "Metal-OH" is formed according to an esterification reaction with the hydroxy group of the oleyl alcohol and the carboxylic acid, and a "Metal-O-Metal" bond is formed by further dehydration.

In the reaction, the oleyl alcohol and the linear alcohol having 14 to 18 carbon atoms are charged into a reaction container such as a three-necked flask, and heated. In a case of charging the solvent into the reaction container, in order to avoid mixing of oxygen and water into the reaction system, the charging is preferably performed in a glove box or the like in which the oxygen concentration and the moisture concentration are controlled.

From the viewpoint that the ITO particles are easily formed, the heating temperature of the solvent is preferably in a range of 230° C. to 320° C., more preferably 250° C. to 310° C., and still more preferably 270° C. to 300° C.

(Synthesis)

The rate at which the precursor solution obtained in the step (I) is added dropwise to the preheated oleyl alcohol (solvent having a hydroxy group) is preferably 1.0 mL/min or more and more preferably 1.5 mL/min or more.

ITO particles can be formed more efficiently by added dropwise at a dropping rate of 1.0 mL/min or more.

The dropping rate can be appropriately adjusted depending on the types of the indium raw material and tin raw material used in the precursor solution to be used, the concentration of the precursor solution, and the like.

In addition, the dropping rate has no particular upper limit, but from the viewpoint of facility cost, can be set to 100 mL/min or less.

By setting the dropping rate to 1.0 mL/min or more, for example, the amount of the precursor solution added dropwise can be set to 50 mL or more, and the ITO particles can be efficiently formed. The amount of the precursor solution added dropwise can be appropriately adjusted depending on composition of the precursor solution, the amount of the alcohol solvent to be used, and the like. The amount added dropwise is preferably 50 mL or more and more preferably 100 mL or more. In addition, from the viewpoint of facility cost, the amount added dropwise is preferably set to 5 L or less.

In this case, since water, liberate acetic acid, and the like are generated with the esterification reaction, it is preferable to flow an inert gas such as nitrogen into the reaction system to discharge water, acetic acid, and the like generated outside the system, from the viewpoint that the esterification reaction is more likely to proceed and the yield of ITO particles is further improved.

The flow rate of the inert gas such as nitrogen is appropriately adjusted depending on the reaction scale, the dropping rate, and the like. Since, in a case where the flow rate of the inert gas is too low, the acetic acid and the like cannot be sufficiently discharged to the outside of the system and bumping may occur in the reaction solution, it is preferable to set a flow rate capable of sufficiently removing the water, acetic acid, and the like.

[Step (III)]

The step (III) is a step of, after the completion of the dropwise addition of the precursor solution, retaining the obtained reaction solution under a temperature condition of 230° C. to 320° C. for 60 minutes to 180 minutes.

After the completion of the dropwise addition of the precursor solution in the step (II), the obtained reaction solution is not immediately cooled, but retained under a temperature condition of 230° C. to 320° C. for 60 minutes to 180 minutes.

The temperature of the reaction solution is not necessarily retained at a constant temperature as long as the temperature is retained in a range of 230° C. to 320° C. within the range of the retention time, and may be initially set to 230° C. and gradually raised, or may be lowered from 320° C. In addition, in a case of using a reaction container equipped with a temperature adjusting mechanism, it is sufficient that the temperature of the reaction solution is maintained within a range of 230° C. to 320° C. even in a case of some temperature fluctuation.

The reaction temperature (temperature of the reaction solution) in the step (II) and the retention temperature in the step (III) may be the same as or different from each other as long as the temperatures are within the respectively defined temperature ranges.

The retention temperature of the reaction solution is preferably in a range of 230° C. to 320° C., more preferably 250° C. to 310° C., and still more preferably 280° C. to 300° C.

The time for retaining the reaction solution at the above-described temperature is preferably 60 minutes to 180 minutes and more preferably 75 minutes to 150 minutes.

By retaining the reaction solution in the above-described temperature range for the above-described time, the defects in the ITO particles, which are a concern in a case of increasing the dropping rate during the reaction, are compensated. That is, by providing the step (III), it is suitable to set the plasmon resonance peak of the ITO particles into a short wave region of 1900 nm or less. The absorption particles of the obtained ITO particles have good absorption in the near infrared region.

The ITO particles obtained by the producing method according to the embodiment of the present disclosure can be suitably used for an optical filter in the near infrared region, an optical lens material using wavelength dispersion, and the like.

The content of indium and the content of tin in the obtained ITO particles are measured by inductively coupled plasma (ICP) mass spectrometry.

(Particle Size of Indium Tin Oxide Particles)

The number-average particle size of the indium tin oxide particles (ITO particles) obtained by the producing method according to the embodiment of the present disclosure is preferably 10 nm to 30 nm, more preferably 15 nm to 25 nm, and still more preferably 20 nm to 25 nm.

By setting the number-average particle size within the above-described range, in a case where the ITO particles are blended into a curable composition and the like, scattering in a visible light region is suppressed and an increase in viscosity of the composition is easily suppressed. By suppressing the increase in viscosity of the composition, the particles can be dispersed in a higher concentration, and as a result, a curable composition having a lower Abbe number can be obtained.

The number-average particle size can be obtained by observing the particles with a transmission electron microscope (TEM), calculating an equivalent circular size of 100 particles, and calculating an arithmetic average value thereof.

In addition, from the viewpoint of controlling the resonance peak sharply, it is preferable that the standard deviation of the number-average particle size is 5 nm or less, and it is more preferable that the standard deviation of the number-average particle size is 3 nm or less.

The standard deviation can be obtained by observing the particles with a transmission electron microscope (TEM), calculating an equivalent circular size of 100 particles, and calculating a standard deviation thereof (Usage Aspect of Indium Tin Oxide Particles)

The indium tin oxide particles (ITO particles) obtained by the producing method according to the embodiment of the present disclosure can be used as optical material by being contained in a curable composition.

Examples of the curable composition (hereinafter, sometimes simply referred to as a "composition") include a composition including the above-described ITO particles obtained by the producing method according to the embodiment of the present disclosure, and a polymerizable compound.

The curable composition is a composition cured by applying energy from the outside, preferably a composition cured by heat or light, and more preferably a composition cured by light.

Hereinafter, a preferred aspect of the curable composition including the ITO particles obtained by the producing method according to the embodiment of the present disclosure will be described together with a producing method thereof <Method for Producing Curable Composition>

Examples of the curable composition include a composition including the above-described ITO particles obtained by the producing method according to the embodiment of the present disclosure, and a polymerizable compound. The curable composition is a composition cured by applying energy from the outside, preferably a composition cured by heat or light, and more preferably a composition cured by light.

The method for producing the curable composition including the indium tin oxide particles obtained by the producing method according to the embodiment of the present disclosure is not particularly limited, and a known method for producing a curable composition can be appropriately applied. Among these, it is preferable to produce the curable composition by the method for producing a curable composition according to the embodiment of the present disclosure described below.

The method for producing a curable composition according to the embodiment of the present disclosure includes a step (first step) of obtaining indium tin oxide particles by the above-described producing method according to the embodiment of the present disclosure, and a step (second step) of obtaining a curable composition having absorption in a near infrared region by mixing the obtained indium tin oxide particles and a polymerizable compound.

In a case of using a curable composition as an optical material, it is preferable that the curable composition is a composition having a low refractive index and a low Abbe number. The Abbe number will be described later.

The Abbe number is a value calculated by Expression 7.

$$\text{Abbe number } v_d = (n_d - 1)/(n_f - n_c): \quad \text{Expression 7}$$

In the expression 7, $n_d$ represents a refractive index for the D line (wavelength of 587.56 nm), $n_f$ represents a refractive index for the F line (wavelength of 486.1 nm), and $n_c$ represents a refractive index for the C line (wavelength of 656.3 nm), respectively.

The C line, D line, and F line are the C line, D line, and F line in the Fraunhofer line.

As described above, since the ITO particles obtained by the producing method according to the embodiment of the present disclosure has a peak wavelength of a plasmon resonance absorption in the near infrared region (for example, a wavelength near 1900 nm), a curable composition having a low Abbe number can be realized, which leads to improvement in performance in a case of being used as a diffraction grating lens and improvement in degree of freedom in a case of designing an optical element.

[First Step in Method for Producing Curable Composition]

The step for producing ITO particles, which is a first step in the method for producing a curable composition according to the embodiment of the present disclosure, is the same as the above-described producing method according to the embodiment of the present disclosure, and the preferred aspects are also the same.

In the first step, since the ITO particles obtained in a state of being dispersed in the solvent are in a state of being dispersed in the reaction solution, a step of purifying the ITO particles may be performed by, for example, subjecting the ITO particles dispersed in the reaction solution to centrifugation by adding ethanol so as to precipitate the particles, removing the supernatant, and redispersing the ITO particles in toluene. The step of purifying the ITO particles may be repeated a plurality of times as necessary.

(Second Step in Method for Producing Curable Composition)

The method for producing a curable composition according to the embodiment of the present disclosure has, as a second step, a step of mixing the obtained indium tin oxide (ITO) particles and a polymerizable compound. By the mixing, a curable composition having absorption in the near infrared region is obtained.

The method of mixing the indium tin oxide particles and the polymerizable compound is not particularly limited. It is preferable that the indium tin oxide particles and the polymerizable compound are stirred and mixed until no separation is visually observed and a uniform mixture is obtained.

(Content of ITO Particles)

In the second step, the amount of the ITO particles to be used in a case of mixing the ITO particles and the polymerizable compound is preferably an amount such that the amount of ITO particles in the obtained curable composition with respect to the total solid content of the composition is 18% by mass or more, more preferably an amount such that the amount of ITO particles in the obtained curable composition with respect to the total solid content of the composition is 38% by mass or more, and still more preferably an amount such that the amount of ITO particles in the obtained curable composition with respect to the total solid content of the composition is 43% by mass or more.

In addition, the content with respect to the total solid content of the composition is preferably 80% by mass or less, more preferably 75% by mass or less, and still more preferably 70% by mass or less.

In the present specification, the "total solid content" refers to the total amount of components in the composition, excluding volatile components such as a solvent.

The content of the ITO particles in the curable composition can be calculated, in a case where the composition is subjected to a thermal mass spectrometry and remaining solid components after heating to a temperature (for example, 500° C.) at which liquid components can be completely removed are regarded as ITO particles, as a mass content of the ITO particles with respect to the total solid content of the curable composition to be measured.

(Polymerizable Compound)

A polymerizable compound which can be used in the method for producing a curable composition according to the embodiment of the present disclosure will be described.

By mixing the above-described ITO particles obtained by the producing method according to the embodiment of the present disclosure and the polymerizable compound, a curable composition containing the ITO particles and the polymerizable compound can be obtained.

The polymerizable compound is not particularly limited as long as the polymerizable compound is a compound which can be polymerized and cured. As the polymerizable compound, a radically polymerizable compound is preferable, and an ethylenically unsaturated compound having at least one ethylenically unsaturated group in the molecule is more preferable.

As the ethylenically unsaturated compound, from the viewpoint of easily setting the refractive index of the curable composition after curing to approximately 1.5 to 1.55, which is a suitable value for use, for example, in a diffraction grating lens, a polyfunctional ethylenically unsaturated compound having two or more ethylenically unsaturated groups is preferable, and a polyfunctional (meth)acrylate compound having two or more (meth)acryloxy groups is more preferable.

Examples of the polyfunctional ethylenically unsaturated compound include 1,4-divinylcyclohexane, 1,4-cyclohexanedimethanol divinyl ether, divinylbenzene, 1,6-divinylnaphthalene, ethoxylated bisphenol A divinyl ether, propoxylated bisphenol A di(meth)acrylate; polyethylene glycol di(meth)acrylate, polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, tricyclodecane dimethanol diacrylate, tri(acryloyloroxyethyl) isocyanurate, tris(2-acryloyloxyethyl) isocyanurate, and compounds similar to these compounds.

The curable composition may contain one kind of polymerizable compound or may contain two or more kinds thereof.

The content of the polymerizable compound in the curable composition is preferably 15% by mass to 85% by mass, more preferably 20% by mass to 70% by mass, and still more preferably 30% by mass to 60% by mass with respect to the total solid content of the curable composition.

(Polymerization Initiator)

The curable composition preferably contains a polymerization initiator.

From the viewpoint that the curable composition is an ultraviolet curing-type curable composition, it is preferable to contain a photopolymerization initiator as the polymerization initiator.

The polymerization initiator can be appropriately selected depending on the polymerizable compound contained in the curable composition. For example, in a case where the curable composition includes a radically polymerizable compound as the polymerizable compound, it is preferable that a polymerization initiator which can be included as desired is a radical polymerization initiator.

Hereinafter, a photoradical polymerization initiator which is a preferred aspect as the polymerization initiator will be described.

As the photoradical polymerization initiator, a photoradical polymerization initiator including an acylphosphine oxide structure, an α-hydroxyalkylphenone structure, or an α-aminoalkylphenone structure is preferable.

The photoradical polymerization initiator is not particularly limited in structure, and examples thereof include 2,4,6-trimethylbenzoyldiphenylphosphine oxide, bis(2,4,6-trimethylbenzoyl)phenylphosphine oxide, 2,2-dimethoxy-1,2-diphenylethan-1-one, 1-hydroxycyclohexyl phenylketone, 1-hydroxycyclohexyl phenylketone, 1-[4-(2-hydroxyethoxy)phenyl]-2-hydroxy-2-methyl-1-propan-1-one, 2-hydroxy-1-{4-[4-(2-hydroxy-2-methyl-propionyl)benzyl]phenyl}-2-methyl-propan-1-one, and 2-methyl-1-(4-methylthiophenyl)-2-morpholinopropan-1-one.

A commercially available product may be used as the photoradical polymerization initiator, and specific examples of the commercially available product include IRGACURE (trademark) series manufactured by BASF (for examples, IRGACURE TPO, IRGACURE 819, IRGACURE 651, IRGACURE 184, IRGACURE 1173, IRGACURE 2959, IRGACURE 127, and IRGACURE 907).

In a case where the curable composition includes a polymerization initiator, the polymerization initiator may be included singly or in combination of two or more thereof.

From the viewpoint of abrasion resistance and high-temperature stretchability of a cured substance obtained by using the curable composition, the content of the polymerization initiator in a case where the curable composition includes the polymerization initiator is preferably 0.05% by mass to 10% by mass, more preferably 0.1% by mass to 10% by mass, still more preferably 0.1% by mass to 5% by mass, and particularly preferably 0.5% by mass to 3% by mass with respect to the total mass of the polymerizable compound.

(Dispersant)

The curable composition may contain a dispersant.

By including the dispersant, dispersibility of the ITO particles in the polymerizable composition can be further increased, and as a result, the obtained curable composition easily achieves high visible light transmission characteristics, low Abbe number, and the like.

As the dispersant which can be included in the curable composition, a cationic surfactant, a nonionic surfactant, and an amphoteric surfactant are effective. In particular, as the surfactant, surfactants of polyester, ε-caprolactone, polycarboxylic acid salt, polyphosphoric acid salt, hydrostearic acid salt, amidosulfonic acid salt, polyacrylic acid salt, olefin-maleic acid salt copolymer, acryl-maleic acid salt copolymer, alkylamine acetate, organic phosphoric acids, alkyl fatty acid salt, fatty acid polyethylene glycol ester, silicone, and fluorine can be used, and among these, it is suitable to use at least one base dispersant selected from the group consisting of ammonia and organic amines.

Specific examples thereof include DISPERBYK series (manufactured by BYK Japan KK), Solsperse series (manufactured by Lubrizol Japan Ltd.), and TAMN series (manufactured by Nikko Chemicals Co., Ltd.). From the viewpoint that dispersibility is easily increased because of adsorbability to the ITO particles and steric hindrance, DISPERBYK-161 (amine type) or DISPERBYK-111 (phosphoric acid type) is more preferable.

In a case where the curable composition includes a dispersant, the dispersant may be included singly or in combination of two or more thereof.

The content of the dispersant in a case where the curable composition includes the dispersant is preferably 1% by mass to 30% by mass, more preferably 3% by mass to 20% by mass, and still more preferably 5% by mass to 15% by mass with respect to the total mass of oxide particles in the curable composition.

(Other Components)

The curable composition may contain other components other than the above-described compounds, in addition to the ITO particles, the polymerizable compound, and the polymerization initiator and the dispersant which are preferred optional components described above.

Examples of the other components include a solvent, a polymerization inhibitor, a surfactant other than the above-described dispersant, a plasticizer, and a sensitizer. In the method for producing a curable composition according to the embodiment of the present disclosure, in order to improve curability of the obtained curable composition and suppress the occurrence of non-uniformity inside the film during curing, it is preferable that the curable composition does not contain a solvent.

The curable composition can be produced by stirring and mixing each of these components. The timing of mixing each component is arbitrary, and it is sufficient that each component is appropriately added depending on the physical properties of each component.

(Characteristics of Curable Composition)

Preferred characteristics of the curable composition obtained by the method for producing a curable composition according to the embodiment of the present disclosure will be shown below.

—Abbe Number—

The curable composition including the ITO particles obtained by the producing method according to the embodiment of the present disclosure can achieve a low Abbe number. From such a viewpoint, the Abbe number of the obtained curable composition is preferably 8 to 30, more preferably 10 to 25, and still more preferably 10 to 20.

The Abbe number of the curable composition is measured using a refractometer DR-M2 manufactured by ATAGO CO., LTD.

—Refractive Index—

In the curable composition, the refractive index nD for light having a wavelength of 589 nm is preferably 1.40 to 1.60 and more preferably 1.40 to 1.55.

The refractive index is measured using a refractometer DR-M2 manufactured by ATAGO CO., LTD.

—Visible Light Transmittance—

In the curable composition according to the present disclosure, the visible light transmittance (hereinafter, sometimes simply referred to as "transmittance") at a wavelength of 405 nm is preferably 85% to 100% and more preferably 90% to 100%.

The visible light transmittance is measured using a spectrophotometer V-670 manufactured by JASCO Corporation, and is a value in a case of being converted into an optical path length of 10 μm.

(Use of Curable Composition)

The curable composition obtained by the method for producing a curable composition according to the embodiment of the present disclosure can be preferably used for producing an optical material having a low Abbe number and low refractive index, and is particularly preferably used for producing a diffraction grating lens. The use of the curable composition is not limited thereto.

EXAMPLES

Hereinafter, the present invention will be described in more detail using examples. However, the present invention is not limited to the following examples as long as it does not depart from the gist of the present invention. In addition, "parts" is on a mass basis unless otherwise specified.

Example 1

First, 75 ml of oleic acid (manufactured by Sigma-Aldrich, Inc., technical grade, purity: 90%), 10.060 g (34.5 mmol) of indium acetate (manufactured by Alfa Aesar, purity: 99.99%), and 1.079 g (3.0 mmol) of tin (IV) acetate (manufactured by Alfa Aesar) were added in a flask, and the mixture was heated at 160° C. for 1 hour under an environment of nitrogen flow to obtain a yellow transparent precursor solution (step (I)). The total molar concentration of metals in the precursor solution was 0.5 mmol/mL.

Subsequently, in another flask, oleyl alcohol (FUJIFILM Wako Pure Chemical Corporation) and 1-hexadecanol (FUJIFILM Wako Pure Chemical Corporation; linear alcohol having 16 carbon atoms) were mixed, 90 ml of a mixed solvent (A+B=91.5% by mass) satisfying the relationship of A/(A+B)=0.105 was added thereto, and the mixture was heated at 290° C. in a nitrogen flow. Thereafter, the precursor solution was added dropwise to the heated solvent at a rate of 1.75 mL/min using a syringe pump to obtain a reaction solution (step (II)). The oleyl alcohol used included a small amount of 1-hexadecanol.

After the completion of the dropwise addition of the precursor solution, the obtained reaction solution was retained at 290° C. for 60 minutes (step (III)). Thereafter, the heating was stopped and the reaction solution was cooled to room temperature.

A represents the concentration (% by mass) of 1-hexadecanol with respect to all solvents, and B represents the concentration (% by mass) of the oleyl alcohol with respect to all solvents. In addition, A+B represents the concentration (% by mass) of 1-hexadecanol and the oleyl alcohol with respect to all solvents.

C represents the total molar content of the oleyl alcohol and 1-hexadecanol, and D represents the molar content of oleic acid included in the precursor solution.

Subsequently, a treatment of subjecting the obtained reaction solution to centrifugation by adding ethanol so as to precipitate particles, removing the supernatant, redispersing the particles in toluene was repeated 3 times to obtain a toluene dispersion of indium tin oxide particles coordinated with oleic acid.

In a case where the indium tin oxide particles were observed with a transmission electron microscope (TEM) and an equivalent circular size of 100 particles was calculated to obtain an arithmetic average value thereof, the number-average particle size was 21 nm.

Examples 2 to 4 and Comparative Examples 1 to 3

Toluene dispersions of indium tin oxide particles were obtained in the same manner as in Example 1, except that the concentration ratio A/(A+B) of the solvent was adjusted as shown in Table 1.

Example 5

A toluene dispersion of indium tin oxide particles was obtained in the same manner as in Example 1, except that the dropping rate of the precursor solution was changed from 1.75 ml/min to 1.00 ml/min using a syringe pump.

Example 6

A toluene dispersion of indium tin oxide particles was obtained in the same manner as in Example 1, except that the temperature of the reaction solution was changed from heating at 290° C. and retaining at 90° C. for 60 minutes after completion of the dropwise addition to heating at 280° C. and retaining at 280° C. for 60 minutes after completion of the dropwise addition.

(Evaluation)
—Absorption Characteristics—

The toluene dispersions of indium tin oxide particles of Examples and Comparative Examples were diluted with toluene to 0.0025% by mass, the absorption characteristics were measured using an optical cell having an optical path length of 1 cm, and the peak wavelength of each plasmon absorption was determined. The measurement was performed using an ultraviolet-visible-near infrared spectrophotometer V-670 manufactured by JASCO Corporation.

The peak wavelength is shown in FIG. 1.

TABLE 1

|  | A/(A + B) | A + B (% by mass) | D/(C + D) |
|---|---|---|---|
| Example 1 | 0.105 | 91.5 | 0.455 |
| Example 2 | 0.098 | 91.5 | 0.455 |
| Example 3 | 0.082 | 90.5 | 0.455 |
| Example 4 | 0.076 | 90.5 | 0.455 |
| Comparative Example 1 | 0.062 | 88.7 | 0.455 |
| Comparative Example 2 | 0.047 | 97.3 | 0.455 |
| Comparative Example 3 | 0.039 | 97.1 | 0.455 |

As shown in FIG. 1, it can be seen that, in a case where A/(A+B) exceeds 0.062, the plasmon absorption wavelength shifts to the short wavelength side.

The absorption characteristics of Examples 5 and 6 were measured by the same method. As a result, the peak wavelengths of plasmon absorption were 1720 nm and 1741 nm, respectively, and it was confirmed that the plasmon absorption wavelength was on the short wavelength side.

Example 7

—Production of Curable Composition—

41.4 µL of DISPERBYK-111 (manufactured by BYK Japan KK) was added, as a dispersant, to the toluene dispersion (ITO particles content: 480 mg) of indium tin oxide particles (ITO particles) obtained in Example 1, 467.3 µL of 1,6-hexanediol diacrylate was further added thereto as a polymerizable compound, and the mixed solution was stirred with a hot stirrer at 40° C. for 1 hour (second step).

The toluene solvent was removed from the obtained mixed solution using an evaporator to obtain an ITO particle-containing curable composition in which the ITO particles were dispersed in the polymerizable compound.

The content of the ITO particles in the ITO particle-containing curable composition was 48% by mass with respect to the total solid content of the composition.

The obtained ITO particle-containing curable composition was evaluated using a refractometer DR-M2 (manufactured by ATAGO CO., LTD.). That is, using the toluene dispersion of ITO particles in Example 1, the curable composition including ITO particles was prepared according to the above-described method, and the refractive index and Abbe number of the curable composition were evaluated.

The Abbe number $v_d$ was 15.9.

The Abbe number is an index indicating the wavelength dispersion of the refractive index in the visible light region, and the Abbe number $v_d$ is calculated by the following equation.

$$v_d = (n_d - 1)/(n_f - n_c)$$

$n_d$: refractive index of d line (587.6 nm)
$n_f$: refractive index off line (486.1 nm)
$n_c$: refractive index of c line (656.3 nm)

The C line, D line, and F line are the C line, D line, and F line in the Fraunhofer line.

The curable composition including the ITO particles obtained by the producing method of Example 1 had an Abbe number ($v_d$) of 19 or less, and had a large wavelength dispersion. In a case where the curable composition has a low Abbe number, it can be expected that a cured substance of the curable composition also has a low Abbe number.

Therefore, in a case where the curable composition is used as a diffraction grating, the height of the diffraction grating can be lowered, and it is possible to significantly reduce the occurrence of flare. Therefore, the ITO particles and curable composition obtained by the producing method according to the embodiment of the present disclosure can be suitably used for various applications such as an optical material.

The disclosure of Japanese Patent Application No. 2019-064592 filed on Mar. 28, 2019 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A method for producing indium tin oxide particles, comprising:
    obtaining a precursor solution including indium and tin by heating an indium carboxylate having 1 to 3 carbon atoms and a tin carboxylate having 1 to 3 carbon atoms in a solvent including a carboxylic acid having 6 to 20 carbon atoms; and
    obtaining a reaction solution including indium tin oxide particles by adding dropwise the obtained precursor solution to a heated solvent including oleyl alcohol and linear alcohol having 14 to 18 carbon atoms,
    wherein, in the solvent, a concentration A of the linear alcohol having 14 to 18 carbon atoms with respect to all solvents, in units of % by mass, and a concentration B of the oleyl alcohol with respect to all solvents, in units of % by mass, satisfy the following expression 1, $$A/(A+B)>0.062:\qquad\text{Expression 1.}$$

2. The method for producing indium tin oxide particles according to claim 1,
wherein the concentration A and the concentration B satisfy the following expression 2, $$A/(A+B)>0.082:\qquad\text{Expression 2.}$$

3. The method for producing indium tin oxide particles according to claim 1,
wherein the concentration A and the concentration B satisfy a condition of the following expression 3, $$(A+B)>90\%\text{ by mass}:\qquad\text{Expression 3.}$$

4. The method for producing indium tin oxide particles according to claim 1,
wherein the linear alcohol having 14 to 18 carbon atoms includes 1-hexadecanol.

5. The method for producing indium tin oxide particles according to claim 1,
wherein a temperature of the heated solvent is 230° C. to 320° C.

6. The method for producing indium tin oxide particles according to claim 1,
wherein, in obtaining the reaction solution including the indium tin oxide particles, the precursor solution is added dropwise at a dropping rate of 1.0 mL/min or more.

7. The method for producing indium tin oxide particles according to claim 1,
wherein a total molar concentration of metals included in the precursor solution is 0.1 mmol/mL or more.

8. The method for producing indium tin oxide particles according to claim 1,
wherein a total content C mol of hydroxy groups included in the oleyl alcohol and the linear alcohol having 14 to 18 carbon atoms and a content D mol of the carboxylic acid having 6 to 20 carbon atoms included in the precursor solution satisfy the following expression 4, $$D/(C+D)<0.5:\qquad\text{Expression 4.}$$

9. The method for producing indium tin oxide particles according to claim 1,
wherein the carboxylic acid having 6 to 20 carbon atoms includes oleic acid.

10. The method for producing indium tin oxide particles according to claim 1,
wherein the indium carboxylate having 1 to 3 carbon atoms is indium acetate, and
the tin carboxylate is tin (IV) acetate.

11. A method for producing a curable composition, comprising:
obtaining indium tin oxide particles by the method for producing indium tin oxide particles according to claim 1; and
obtaining a curable composition having absorption in a near infrared region by mixing the obtained indium tin oxide particles and a polymerizable compound.

* * * * *